(12) United States Patent
Metzger

(10) Patent No.: US 9,702,736 B2
(45) Date of Patent: Jul. 11, 2017

(54) HOUSING AND METHOD OF MAKING SAME

(75) Inventor: Ronald Alan Metzger, Waynesville, OH (US)

(73) Assignee: YSI INCORPORATED, Yellow Springs, OH (US)

( * ) Notice: Subject to any disclaimer, the term of this patent is extended or adjusted under 35 U.S.C. 154(b) by 1172 days.

(21) Appl. No.: 13/439,249

(22) Filed: Apr. 4, 2012

(65) Prior Publication Data

US 2013/0264918 A1  Oct. 10, 2013

(51) Int. Cl.
| | |
|---|---|
| *F16L 39/00* | (2006.01) |
| *F16L 9/18* | (2006.01) |
| *F16L 9/19* | (2006.01) |
| *F16L 7/00* | (2006.01) |
| *G01D 5/245* | (2006.01) |

(52) U.S. Cl.
CPC ............ *G01D 5/245* (2013.01); *F16L 7/00* (2013.01); *F16L 9/18* (2013.01); *F16L 39/005* (2013.01)

(58) Field of Classification Search
CPC ..... H01M 2/0267; G01D 5/245; F16L 39/005
USPC ............................ 138/111, 113, 115, 116, 117
See application file for complete search history.

(56) References Cited

U.S. PATENT DOCUMENTS

| | | | | |
|---|---|---|---|---|
| 1,931,465 | A | * | 10/1933 | Gyzling ................. F16L 59/12 138/113 |
| 2,235,714 | A | | 3/1941 | Lennan |
| 3,314,823 | A | | 4/1967 | Balaguer |
| 3,438,430 | A | * | 4/1969 | Kestemont ............. F22B 1/066 138/113 |
| 3,882,394 | A | | 5/1975 | Koster et al. |
| 4,410,013 | A | * | 10/1983 | Sasaki ................... B21C 37/154 138/113 |
| 4,566,435 | A | * | 1/1986 | Kadotani ................ F24J 2/055 126/655 |
| 5,235,526 | A | | 8/1993 | Saffell |
| 5,265,652 | A | * | 11/1993 | Brunella ............. B67D 7/0478 137/234.6 |
| 5,427,268 | A | | 6/1995 | Downing, Jr. et al. |

(Continued)

FOREIGN PATENT DOCUMENTS

| | | | |
|---|---|---|---|
| CN | 2228167 | | 5/1996 |
| CN | 2228167 Y | * | 5/1996 |

(Continued)

OTHER PUBLICATIONS

International Search Report and Written Opinion, PCT/US2013/033799 (Sep. 17, 2013).

(Continued)

*Primary Examiner* — R. A. Smith
*Assistant Examiner* — Herbert K Roberts
(74) *Attorney, Agent, or Firm* — Thompson Hine LLP

(57) ABSTRACT

A housing for encapsulating a power supply for a sonde is disclosed. The housing includes an inner support overmolded with an outer sleeve. The inner support may be metal or plastic and may include an outer tube and an inner tube that are integral with one another with the outer tube providing the exterior surface of the inner support and being spaced apart from the inner tube except where the inner and outer tubes share a common arc. When both the inner support and the outer sleeve are plastic, the inner support includes a reinforced plastic and the outer sleeve includes a non-reinforced plastic.

22 Claims, 4 Drawing Sheets

(56) References Cited

U.S. PATENT DOCUMENTS

| | | | |
|---|---|---|---|
| 5,530,357 A | 6/1996 | Cosman et al. | |
| 5,601,359 A | 2/1997 | Sharrah et al. | |
| 5,821,405 A | 10/1998 | Dickey et al. | |
| 6,088,580 A | 7/2000 | Powlousky | |
| 6,470,979 B1 | 10/2002 | Wentworth et al. | |
| 6,564,831 B1* | 5/2003 | Sanoner | B29C 47/0028 138/115 |
| 6,644,421 B1 | 11/2003 | Long | |
| 6,677,861 B1 | 1/2004 | Henry et al. | |
| 6,749,367 B1* | 6/2004 | Terry, III | E03F 1/002 138/113 |
| 6,779,383 B2 | 8/2004 | Lizotte et al. | |
| 6,798,347 B2 | 9/2004 | Henry et al. | |
| 6,928,864 B1 | 8/2005 | Henry et al. | |
| 6,938,506 B2 | 9/2005 | Henry et al. | |
| 7,007,541 B2 | 3/2006 | Henry et al. | |
| 7,007,720 B1* | 3/2006 | Chase | F16L 59/12 138/110 |
| 7,015,284 B2 | 3/2006 | Ajbani et al. | |
| 7,036,206 B2 | 5/2006 | Worden et al. | |
| 7,138,926 B2 | 11/2006 | Henry et al. | |
| 7,221,136 B2 | 5/2007 | Olsson et al. | |
| 7,298,126 B1 | 11/2007 | Olsson et al. | |
| 7,451,783 B2* | 11/2008 | Kamiyama | F16L 7/00 138/112 |
| 7,671,754 B2 | 3/2010 | Heilmann et al. | |
| 7,753,082 B2* | 7/2010 | Anno | F16L 11/20 138/108 |
| 7,863,885 B1 | 1/2011 | Olsson et al. | |
| 7,882,856 B2* | 2/2011 | Berry, Jr. | F16L 7/00 138/108 |
| 7,986,145 B2 | 7/2011 | Sorbier et al. | |
| 2002/0036019 A1* | 3/2002 | Woelfel | F16L 11/22 138/115 |
| 2002/0170612 A1* | 11/2002 | Penza | F16L 7/00 138/108 |
| 2003/0111473 A1 | 6/2003 | Carter et al. | |
| 2003/0166366 A1 | 9/2003 | Kemp et al. | |
| 2004/0137321 A1 | 7/2004 | Savaria et al. | |
| 2006/0006875 A1* | 1/2006 | Olsson | G01V 3/081 324/338 |
| 2008/0008879 A1 | 1/2008 | Elia et al. | |
| 2008/0123329 A1* | 5/2008 | Bernard Dubois | F21L 4/027 362/183 |
| 2009/0061301 A1* | 3/2009 | Planck | H01M 2/105 429/160 |
| 2010/0052213 A1 | 3/2010 | Oohashi et al. | |
| 2011/0042117 A1 | 2/2011 | Doege et al. | |
| 2011/0271518 A1 | 11/2011 | Metzger | |

FOREIGN PATENT DOCUMENTS

| | | | |
|---|---|---|---|
| EP | 0865109 | 9/1998 | |
| EP | 0865109 A2 * | 9/1998 | H01R 13/562 |
| JP | 3-5993 | 2/1991 | |
| JP | 2007-018827 | 1/2007 | |
| JP | 2007-213941 | 8/2007 | |
| JP | 2007-273180 | 10/2007 | |
| KR | 2002-089026 | 11/2002 | |
| WO | 2009/014934 | 1/2009 | |
| WO | 2009/039493 | 3/2009 | |

OTHER PUBLICATIONS

Invitation to Pay Additional Fees and Partial International Search, PCT/US2013/033799 (Jul. 2, 2013).
Material Detail—Xenoy® polycarbonate/PBT plastic alloy, by the Materials Information Society, ASM International (2011).
Gemini Plastics Inc., Thermo Fab Plastics Inc., (Jan. 10, 2010) XP002698757, www.gplastics.com/pdf/polycarbonate.pdf (retrieved from the internet on Jun. 12, 2013).
CN, Notification of the First Office Action; Patent Application No. 201380026104.3 (Dec. 3, 2015).
CN, Office Action, Chinese Patent Application No. 201380026104.3 (Jun. 23, 2016).
GB, Examination Report, Patent Application No. GB1419387.4 (Jul. 20, 2016).
AU, Australian Patent Examination Report No. 1, Australian Patent Application No. 2013243743 (Apr. 12, 2016).
JP, Notification of Reasons for Refusal, Japanese Patent Application No. 2015-504619, 8 pages (Feb. 28, 2017).

* cited by examiner

US 9,702,736 B2

HOUSING AND METHOD OF MAKING SAME

TECHNICAL FIELD

The present application relates to a housing and method of making said housing, more particularly, to a housing of a sonde in which the batteries are stored, and more particularly to a housing including an over-molded plastic.

BACKGROUND

Sondes having a plurality of sensor-containing probes have been used to monitor water quality and conditions of water sources for many years. Examples of sondes are disclosed in U.S. Pat. No. 6,779,383 to Lizotte et al., U.S. Pat. No. 5,821,405 to Dickey et al., U.S. Pat. No. 5,235,526 to Saffell, and U.S. Pat. Nos. 6,677,861, 6,798,347, 6,928,864, 6,938,506, 7,007,541, and 7,138,926 to Henry et al.

Current sonde housings may include metal, plastic or a combination thereof, but are limited to low pressure ratings. The plastic contributes to the low pressure rating due to the reduced material strength it has compared to metal. Metal is often more expensive than plastic and is susceptible to rusting, especially when as the exterior of the housing and exposed to fresh water or salt water. However, plastics, in particular thermoplastics, have several disadvantages in comparison to metal: low rigidity and tensile strength; dimensional instability as a result of a high temperature coefficient of expansion and high water absorption; low maximum service temperature; low impact strength; low hardness and scratch resistance; and low creep resistance. The disadvantages need to be overcome to take advantage of the cost saving of using plastics.

SUMMARY

To overcome the shortcomings in existing sonde housing, an interior support structure or substrate has been added within an outer tube of plastic, for example by over-molding the outer tube to the interior support structure or substrate, to impart enhanced strength to the outer tube of plastic. This allows the outer tube of plastic to be used as the exterior surface of the sonde housing in place of metal in high pressure applications without being subject to corrosion like most metals.

Disclosed herein are housings that include plastic that overcome the disadvantages mentioned above. The housings, moreover, are suitable pressure vessels that can withstand the conditions present when submersed at depths of 100 meters to 300 meters, even in sea water.

Housings disclosed herein encapsulate a power supply for a sonde. The housings include an inner support over-molded with an outer sleeve. The inner support may be metal or plastic and may include an outer tube and an inner tube that are integral with one another with the outer tube providing the exterior surface of the inner support and being spaced apart from the inner tube except where the inner and outer tubes share a common arc. When both the inner support and the outer sleeve are plastic, the inner support includes a reinforced plastic and the outer sleeve includes a non-reinforced plastic.

In one embodiment, the housings may include an inner support of a glass-filled plastic and defining at least one chamber therein that has an outer sleeve of a non-reinforced plastic over-molded directly to the exterior surface of the inner support to form an integrally molded body. The glass-filled plastic has a similar or higher melting point than the non-reinforced plastic, and the integrally molded body can withstand external compressive forces when surrounded by water at a depth of about 100 meters to about 300 meters.

In another embodiment, the housings may include an inner sleeve defining a chamber configured to house at least one battery and having a first end and a second end that are both open, and an outer sleeve of non-reinforced plastic over-molded directly onto the inner sleeve. The outer sleeve has at least one end thereof that is open. The open end is connectable with a watertight seal to a sonde body comprising electronics to power the electronics when a battery is present in the chamber in the inner sleeve.

Also disclosed herein are methods of molding the inner support or inner sleeve and over-molding the outer sleeve thereto. Alternately, the inner support or inner sleeve may be pre-formed and the method may include over-molding the plastic thereto to form the outer sleeve.

DETAILED DESCRIPTION

Figure 1:
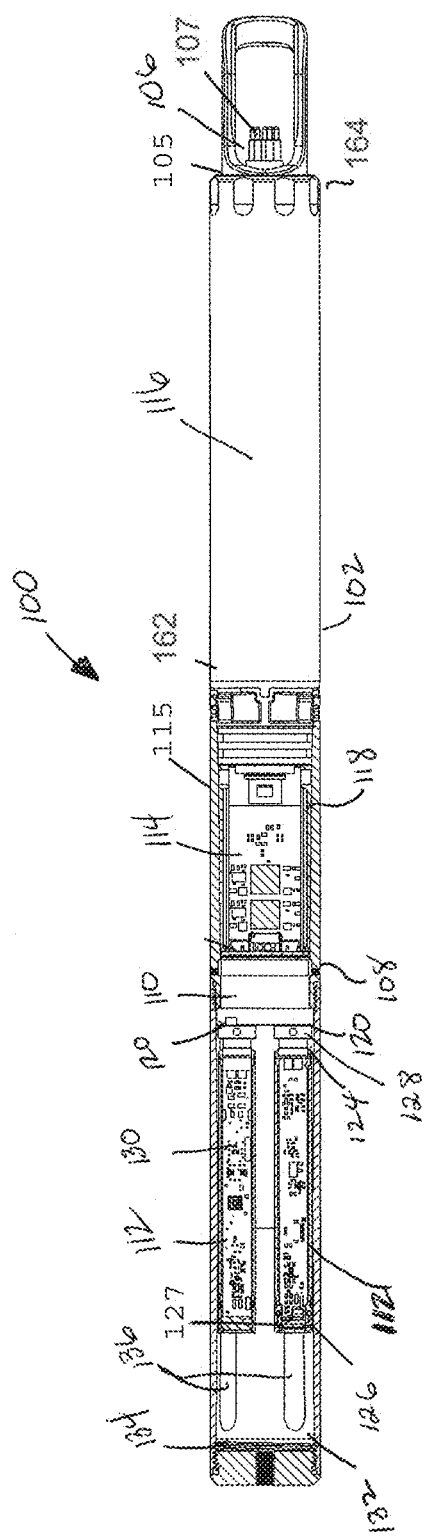
FIG. 1 is a top view, in a partial cross-section, of a sonde that includes the inventive battery housing.

The following detailed description will illustrate the general principles of the invention, examples of which are additionally illustrated in the accompanying drawings. In the drawings, like reference numbers indicate identical or functionally similar elements.

Figure 2:
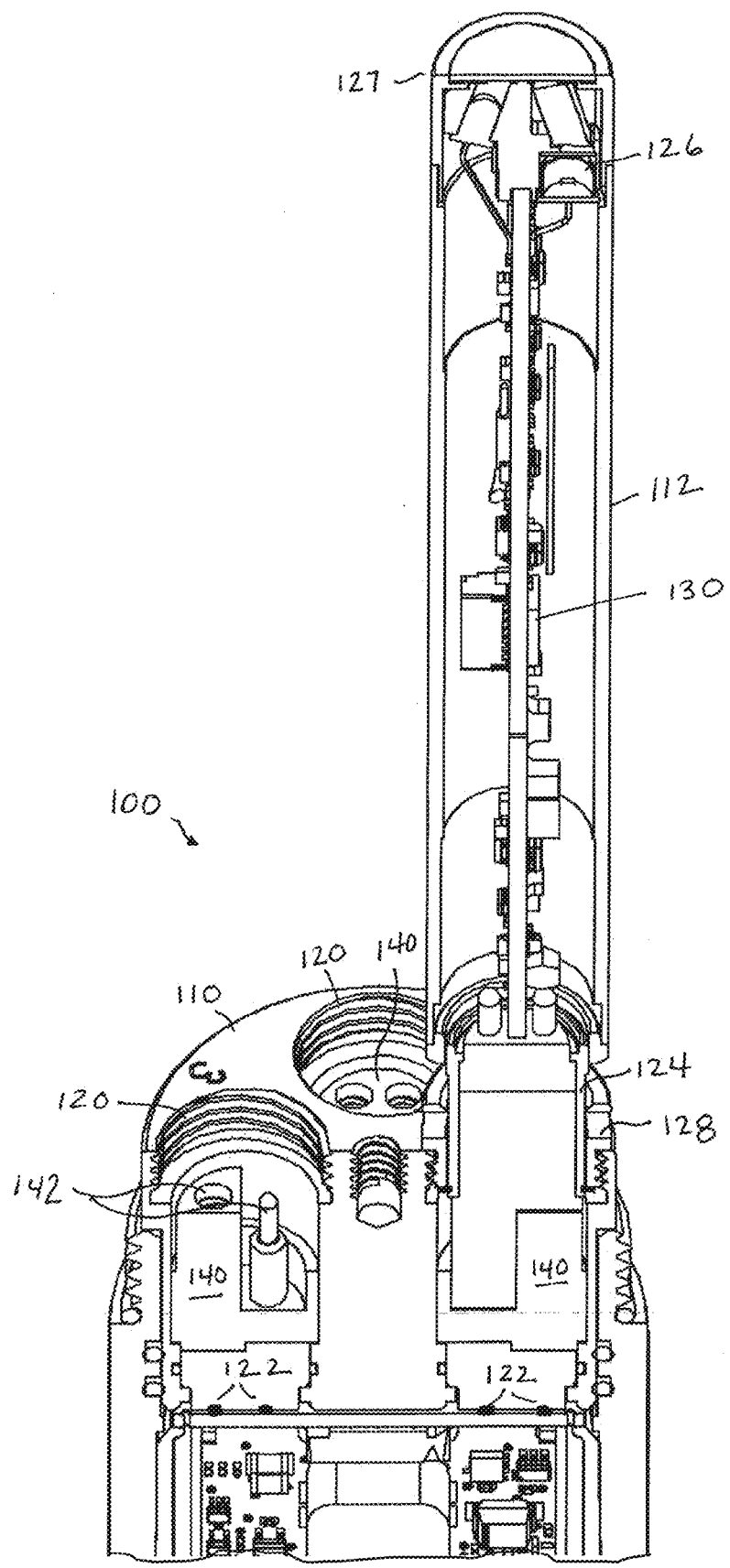
FIG. 2 is a side perspective view, in cross-section, of the distal end of the sonde showing one sensor-containing probe connected thereto.

Referring to FIGS. 1 and 2, a sonde, generally designated 100, as illustrated, may be a multi-parameter sonde because it may have one or more probes 112 that each include at least one sensor 126 for detecting and/or measuring conditions of the environment surrounding the probes 112. In a preferred embodiment, the sonde 100 is designed and constructed to be at least partially submersible such that the probes detect and/or measure conditions of water. In one embodiment, the sonde 100 is designed and constructed to be fully submersible.

The sonde 100 as seen in FIG. 1 includes an elongate housing 102 having two primary sections: a first housing 115 encapsulating the electronics 114 of the sonde 100 which may be assembled on a main circuit board 118; and a second housing 116 encapsulating the power supply such as one or more batteries (not shown). The first housing 115 may be referred to herein as a sonde body and the second housing 116 may be referred to as a battery housing. The elongate housing 102 has a first end 162 and has a second end 164 that includes a wet mateable connector 106 for connection to a cable that links the sonde to one or more devices (such as a computer, a data logger, a data collection platform, or other interface to display and enter data) to receive information or data from the sonde 100 and has a distal end 108 closed by an interface cap 110 that electronically couples the sensor-containing probes 112 to the electronics 114 within the first housing 115.

The interface cap 110 as illustrated in FIG. 2 includes a plurality of ports 120 that are each configured to receive a probe 112. Each port 120 contains a probe-to-circuit board connector 140 that environmentally seals the port. In one embodiment, the probe-to-circuit board connectors 140 are uniform and the probes 112 are queried and identified after they are inserted into the sonde 100. The probe-to-circuit board connector 140 includes at least one wet mateable male or female connector 142 facing the port 120 and typically includes solderable pins 122 facing the main circuit board 118 for electrical connection thereto. Male or female wet mateable connectors 142 eliminate the use of O-rings within the ports 120 and/or on the port-end 124 of the probe 112.

Still referring to FIGS. 1 and 2, the sensor containing probes 112 may include a pH probe, a turbidity probe, a conductivity probe, etc. for connection to the ports 120 of the interface cap 110. Each probe 112 has a port-end 124 and a sensor end 127. The port-end 124 includes a threaded collar 128 that threads into the port 120 after the port-end 124 of the probe 112 is fully inserted into one of the ports 120 of the interface cap 110 to mate the male/female wet mateable connectors. The ports 120 and the port-ends 124 of the probes are all the same shape such that the probes are interchangeable. Inside each probe is a circuit board 130 with memory. The probes 112 can communicate with the main circuit board 118 in the sonde 100 so that the sonde can operate the probe and receive/analyze data.

As illustrated in FIG. 1, the sonde 100 may include a guard 132 that covers the probes 112. The guard 132 may include a built-in reflector 134 to direct scattered light away from the probes 112 when a turbidity probe is used with the sonde 100. The guard 132 has a plurality of openings 136 to allow water or the fluid being tested to flow to the probes 112.

The proximal end 104 of the sonde 100 includes the wet-mateable connector 106. The proximal end 104 is a sealed, closed end of the housing 102 with wet-mateable pins 107 extending therethrough (i.e., has a watertight sealed closure). As mentioned above, the sonde 100 through a connection to the wet-mateable connector 106 via a cable is capable of communicating with various monitoring and/or control devices. Alternately, a plurality of sondes 100 can be interconnected to one another and to the same monitoring/control device. In one embodiment, the sondes 100 can be connected to one another as a string in series with pass-through technology (i.e., no communication between the sondes themselves) to suspend the sondes 100 to monitor at different depths.

Figure 3:
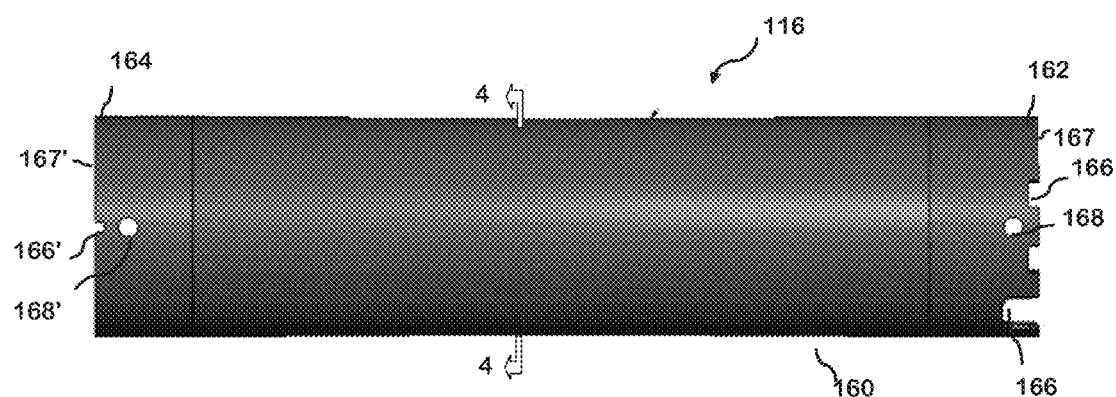
FIG. 3 is a top view of the battery housing for use with a sonde similar to the sonde illustrated in FIG. 1.
Figure 4:
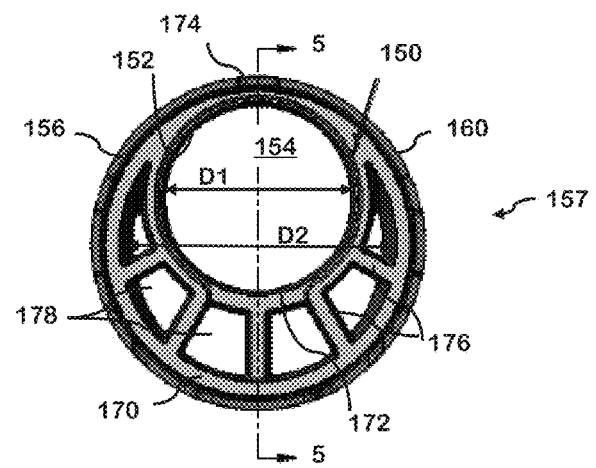
FIG. 4 is a transverse view, in cross-section, of the battery housing of FIG. 3.
Figure 5:
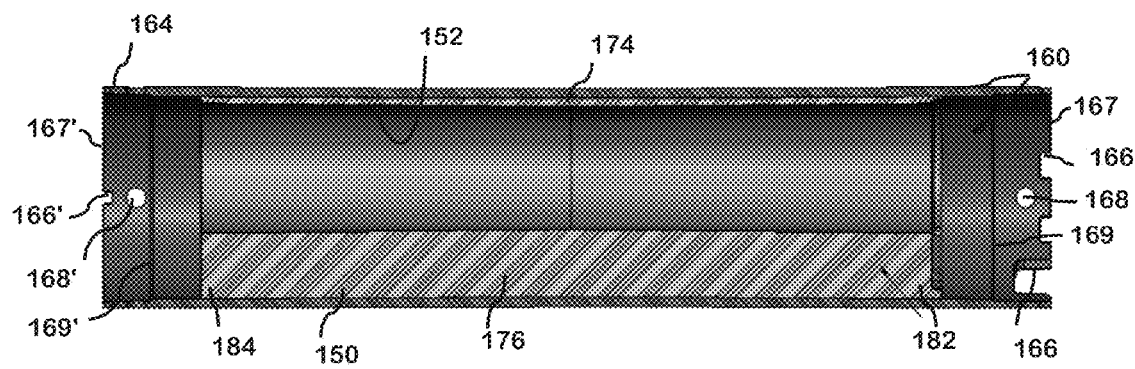
FIG. 5 is a longitudinal view, in cross-section, of the battery housing of FIG. 3.

Referring to FIGS. 3-5, one embodiment of the second housing 116 is shown in multiple views. The second housing 116 as shown in FIG. 4 includes an inner support 150 made of or including a first plastic over-molded with a second plastic that has a similar or lower melting point than the first plastic to form the outer sleeve 160. The difference in melting points enables the inner support to maintain its form (i.e., shape and configuration) while the second plastic is melted and then molded thereto. The melting points or the difference therein between the two materials varies widely based on the materials chosen for the substrate and the overmold, and the type of mechanical bond desired therebetween. In one embodiment, when the overmold has a lower melting point than the substrate: the substrate may melt at about 5° C. to about 40° C. higher than the overmold to maintain the full integrity of the substrate structure. However, this again is dependant on the materials and the type of bond desired therebetween. In another embodiment, we successfully molded two materials having the same base material with a 20° C. temperature difference between the substrate and the overmold (overmold being hotter than the substrate). This allowed us to slightly melt the surface of the substrate to bond the two materials together. The melting points may be similar because the substrate is in the mold for only a short time at the overmold temperature. The time is enough for re-melting of the surface of the substrate (to form the bond to the overmold), but not deform the structure.

In one embodiment, the first plastic is a glass-filled plastic (the glass filler makes this a reinforced plastic) having an outer sleeve 160 comprising a non-reinforced plastic (the second plastic) over-molded directly to the exterior surface 156 of the inner support 150 to form an integrally molded body or housing 157. An advantage to using a filled plastic or reinforced plastic forming the inner support 150 and a non-reinforced plastic forming the outer sleeve 160 is the difference in melting points provided by the addition of the filler in the plastic. The filler may result in the reinforced plastic having a similar or higher melting point than the non-reinforced plastic, especially if the plastic included in the first and the second plastic are the same. These materials are advantageous because they provide an integrally over-molded housing 157 that can withstand the external compressive forces of water at a depth of about 100 meters to about 300 meters and/or the other conditions such as temperature at such depths.

The glass-filled plastic and the non-reinforced plastic materials may be a polycarbonate, a polybutylene terephthalate, a polyethylene terephthalate, and combinations thereof. In one embodiment, the glass-filled plastic and the non-reinforced plastic both comprise the same plastic material, which may be a blend of polycarbonate and polybutylene terephthalate or a blend of polycarbonate and polyethylene terephthalate; however, the glass-filled plastic has a similar or higher melting point than the non-reinforced plastic.

Preferably, the glass-filled plastic is about 30% glass-filled to about 70% glass filled. The glass-filled plastic may be a 30% glass-filled plastic, a 35% glass-filled plastic, a 40% glass-filled plastic, a 45% glass-filled plastic, a 50% glass-filled plastic, a 55% glass-filled plastic, a 60% glass-filled plastic, a 65% glass-filled plastic, or a 70% glass-filled plastic. The glass filler may be glass powder, glass beads, glass flakes, or glass fibers. The glass fibers may be short, long, mats of fibers, woven fibers, random free fibers, or combinations thereof.

In another embodiment, both the first plastic and the second plastic are considered non-reinforced plastics and must be different plastics or blends of plastics to have different melting points. For example, the first plastic may be selected from one or more of the following plastics: Xenoy™ resins available from SABIC Global; polycarbonate; acrylonitrile butadiene styrene; polybutylene terephthalate; and a polycarbonate/acrylonitrile butadiene styrene blend and the second plastic may be selected from one or more of the following plastics: Xenoy™ resins available from SABIC Global; polycarbonate; acrylonitrile butadiene styrene; polybutylene terephthalate; polycarbonate/acrylonitrile butadiene styrene blend. Xenoy™ resins are blends of semi-crystalline polyester (typically, polybutylene terephthalate or polyethylene terephthalate) and polycarbonate. As described above, the selection of the first and second plastics is dependent upon having a similar or lower melting point second plastic compared to the first plastic which forms the inner support.

As illustrated in FIGS. 4-5, the integrally over-molded housing 157 includes an outer sleeve 160 over-molded directly to the exterior surface 156 of the inner support 150. The inner support 150 includes an outer tube 170 and an inner tube 172 that are integral with one another, the outer tube 170 defining the exterior surface 156 of the inner support 150 and being spaced apart from the inner tube 172 except where the outer and inner tubes 170, 172 share a common arc 174. Both the inner tube 172 and the outer tube 170 may have first ends 162, 182 and second ends 164, 184 that are both open as illustrated in FIG. 5. The inner tube 172 may be shorter in length than the outer tube 170 such that the outer tube 170 has female ends as the first and second ends 162, 164 for mating with or receiving other components of the sonde 100 as seen in FIG. 3.

In one embodiment, the outer sleeve 160 may be molded to have an ergonomic portion to provide a watertight seal. The ergonomic portion may have an inward contour that is easier to grasp (i.e., it has a better fit in a user's hand). In one embodiment, the outer sleeve 160 may have a larger outer perimeter at the first end 162 compared to the outer perimeter more proximate a generally central position between the first end 162 and the second end 164. In another embodiment, the inward contour may also be included in the exterior surface 156 of the inner support 150.

As illustrated in FIG. 3, the first female end 162 may include a plurality of notches 166 in the terminal rim 167 thereof. The notches 166 may act as alignment features for alignment with the component of the sonde 100 that is receivable in the first female end 162. The first female end 162 may also include a hole 168 through one side thereof for receipt of a fastener such as a screw to securely, removeably connect the housing 116 to the sonde 100, in particular to the first housing 115 (FIG. 1). The second female end 164 may also include one or more notches 166' in its terminal rim 167' as alignment features for alignment with another component of the sonde 100. The second female end 162 may be connectable to the connector 106 and may include a hole 168' through a side thereof for receipt of a fastener such as a screw to securely, removeably connect the two components together. As seen in FIG. 5, the outer sleeve 160 may include annular seats 169, 169' located a distance interior from their respective terminal rims 167, 167' for both ends 162, 164 to receive a sealing ring (not shown). The sealing ring provides a watertight seal between the second housing 116 and the other components of the sonde 100, which protects the batteries and electronics from exposure to water. As shown in FIG. 1, the first end 162 may be connectable to the first housing 115 with a watertight seal and the second end 164 may be connectable to an end cap 105 that includes the connector 106 with a watertight seal.

Figure 6A:
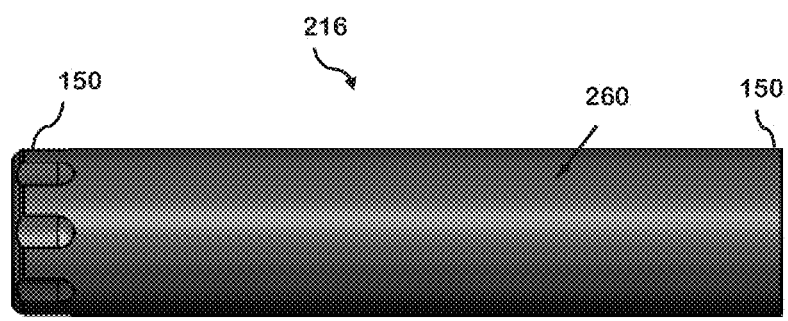
FIG. 6A is a top view of another embodiment of a battery housing for use with a sonde similar to the sonde illustrated in FIG. 1.
Figure 6B:
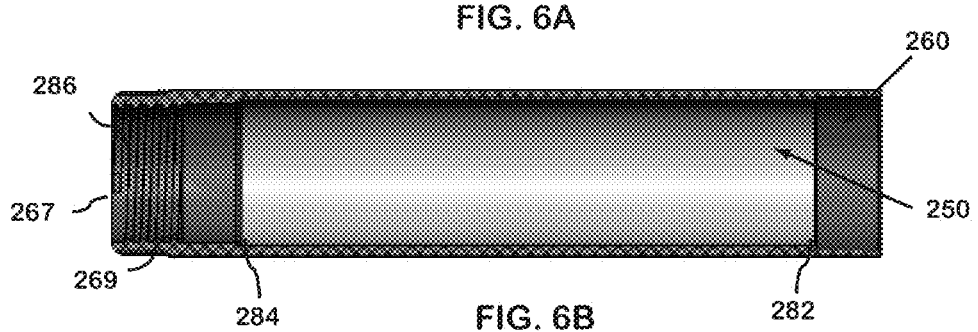
FIG. 6B is a longitudinal view, in cross-section, of the battery housing of FIG. 4A.

In another embodiment, as illustrated in FIG. 6B, one or both ends 262, 264 of the outer sleeve 260 may include threading 286 within a female end for connection to another component of the sonde 100. The female end may include an annular seat 269 located a distance interior from the terminal rim 267 to receive a sealing ring (not shown).

As illustrated in FIG. 4, the inner support 150 includes an outer tube 170 and an inner tube 172 that are integral with one another, the outer tube 170 defining the exterior surface 156 of the inner support 150 and being spaced apart from the inner tube 172 except where the outer and inner tubes 170, 172, share a common arc 174. As expected by the names inner tube and outer tube, the inner tube 172 has a diameter D1 (FIG. 4) that is smaller than the diameter D2 (FIG. 4) of the outer tube 170. The inner support 150 has a longitudinal bore 152 that defines at least one chamber 154 configured to house at least one power source, such as a battery (not shown). The chamber 154 may be dimensioned to receive one or more AA batteries, AAA batteries, C batteries, D batteries, 9V batteries or the like. The inner support 150 may include one or more ribs 176 between the inner tube 172 and the outer tube 170 where they are spaced apart from one another, which may be opposite the common arc 174. The ribs are advantageous because they increase the strength of the inner support 150 to resist the pressures and temperatures at depths of 100 meters to 300 meters.

The ribs 176 as seen in FIGS. 4 and 5 preferably run longitudinally the length of the inner support 150. This orientation of the ribs 176 may define a plurality of channels 178 extending longitudinally through the integrally over-molded housing 157. These channels may house wiring or other electronics (not shown) that connect the main circuit board 118 to the connector 106 (FIG. 1). The ribs 176 may also include trusses (not shown) that extend transversely or arcuately between adjacent ribs to add further structural support to the second housing 116. The ribs 176 are advantageous because they save material (reduce cost), but add strength. In another embodiment, rather than ribs 176, the space between the inner tube 172 and the outer tube 170 could be filled or partially filled with plastic material.

In one embodiment, the inner tube 172 and the outer tube 170 are generally elliptical in cross-section. In another embodiment, the inner tube 172 is generally circular in cross-section and the outer tube 170 is generally elliptical in cross-section.

FIGS. 6A-6B are various views of an alternate embodiment of the second housing 116. The second housing in this embodiment is generally designated 216 and has an outer sleeve 260 over-molded onto an inner metal sleeve 250 such that the housing can withstand the external compressive forces of water at a depth of about 100 meters to about 300 meters and/or the other conditions such as temperature at such depths. The outer sleeve 260 may be constructed as described above including a configuration of notches and holes or other alignment/attachment features. Preferably, the outer sleeve 260 is a non-reinforced plastic as discussed above. The inner metal sleeve 250 is generally an elongate hollow cylinder having an open first and an open second end 282, 284. The inner metal sleeve 250 is typically shorter than the outer sleeve 260 such that the outer sleeve 260 has female ends as described above for connecting the second housing 216 to other components of a sonde 100.

As described above, the outer sleeves 160, 260 are over-molded over the inner support 150 or the inner metal sleeve 250. Over-molding is any molding process where two or more materials are combined to produce a single part. Typically, over-molding is the production of an injection-molded part that combines two or more materials together wherein at least one of the materials is a plastic that can be injected into the mold. The outer sleeves 160, 260 are or include the plastic and the inner support 150 or inner metal sleeve 250 is the rigid material.

The over-molding may be accomplished using insert molding techniques, or two-shot or multi-shot techniques. With respect to second housing 116 illustrated in FIGS. 3-5, the over-molding process, in one embodiment, includes providing a mold configured to form the inner support 150, molding an inner support 150 of glass-filled plastic; providing an insert mold configured to receive the molded inner support 150 and to form the outer sleeve 160; and molding the outer sleeve 160 of non-reinforced plastic over the molded inner support 150. In another embodiment, the method may include providing a pre-formed inner support 150, providing an insert mold configured to receive the pre-formed inner support 150 and to form the outer sleeve 160, and molding the outer sleeve 160 of non-reinforced plastic over the pre-formed inner support 150. The method may also include the step of removing the molded integral body 157 from the insert mold. The two molding steps may include the step of injecting the plastic into mold.

With respect to the second housing 216 illustrated in FIGS. 6A-6B, the over-molding process, in one embodiment, includes providing a metal sleeve 250, providing an insert mold configured to receive the metal sleeve 250 and to form an outer sleeve 260, and molding an outer sleeve 260 of plastic over the metal sleeve 250. The method may also include the step of removing the molded integral body from the insert mold. The two molding steps may include the step of injecting the plastic into mold.

No primers or adhesives are required to bond either of the outer sleeves 160, 260 to the inner support 150 or the inner metal sleeve 250. Instead, in the embodiment where both the inner and the outer sleeves are made of plastic, the inner support 150 is or includes a reinforced plastic such as a glass-filled plastic and the outer sleeve 160 is or includes a non-reinforced plastic that has a similar or lower melting point than the reinforced plastic. This is advantageous because the inner support 150 will not melt and lose its shape during the molding step of the outer sleeve 160. Moreover, the inner support 150 may soften some at its exterior surface 156 which will allow the plastic forming the outer sleeve 160 to intermix with the plastic forming the exterior surface 156 to form an integrally molded body 157.

In another embodiment, the molding process may be a multi-shot process. Here, both the reinforced plastic and the non-reinforced plastic are injected into the same mold during the same molding cycle, wherein the reinforced plastic forms the inner support and the non-reinforced plastic forms the outer sleeve.

The over-molding process is preferably carried out in a manner that results in the outer sleeve 160 and the inner support 150 having uniform thicknesses. The thickness of both the inner support 150 and the outer sleeve 160 may be about 1/16 inch to about 4/16 inch.

It will be appreciated that while the invention has been described in detail and with reference to specific embodiments, numerous modifications and variations are possible without departing from the spirit and scope of the invention as defined by the following claims.

What is claimed is:

1. A housing comprising:
an inner support having an exterior surface and comprising an outer tube and an inner tube, wherein, in a transverse cross-section of the inner support, the outer tube and inner tube share a common wall and the outer tube is spaced apart from the inner tube to define a longitudinal channel therebetween, except at the common wall;
an outer sleeve comprising a plastic over-molded directly to the exterior surface of the inner support to form an integrally molded body;
wherein the plastic has a similar or lower melting point than a material forming the inner support, and the integrally molded body can withstand external compressive forces when surrounded by water at a depth of about 100 meters to about 300 meters;
wherein the material forming the inner support includes metal or a second plastic;
wherein the second plastic is a reinforced plastic;
wherein the plastic of the outer sleeve and the second plastic both comprise plastic materials selected from the group consisting of a polycarbonate, a polybutylene terephthalate, a polyethylene terephthalate, and combinations thereof; and
wherein the inner tube further comprises one or more ribs extending outward from an exterior surface of the inner tube to an interior surface of the outer tube.

2. The housing of claim 1 wherein the plastic of the outer sleeve is non-reinforced plastic.

3. The housing of claim 1 wherein the reinforced plastic comprises about 30% to about 70% filler.

4. The housing of claim 1 wherein the first plastic and the second plastic both comprise the same plastic material.

5. The housing of claim 4 wherein the same plastic material is a blend of a polycarbonate and a polybutylene terephthalate or a polycarbonate and a polyethylene terephthalate.

6. The housing of claim 1 wherein the plastic of the outer sleeve is selected from the group consisting of non-reinforced plastic comprising a blend of blends of a semi-crystalline polyester and a polycarbonate, and the second plastic is selected from the group consisting of reinforced plastic comprising a blend of blends of a semi-crystalline polyester and a polycarbonate.

7. The housing of claim 1 wherein the inner support has a first end and a second end that are both open and the outer sleeve has at least one end thereof that is open and connectable with a watertight seal to a sonde body comprising electronics to power the electronics when a battery is present in the chamber in the inner support.

8. The housing of claim 7 wherein the open end of the outer sleeve includes threading and an annular seat located a distance interior from the open end for receipt of a sealing ring.

9. The housing of claim 8 wherein the inner support includes metal.

10. The housing of claim 1 wherein the longitudinal channel extends the length of the inner support.

11. A housing comprising:
an inner support comprising an outer tube and an inner tube that are integral with one another, the outer tube providing the exterior surface of the inner support, wherein, in a transverse cross-section of the inner support, the outer tube is spaced apart from the inner tube to define a longitudinal channel between the inner tube and the outer tube except where the inner and outer tubes share a common wall;
an outer sleeve molded directly to the exterior surface of the inner support;
wherein the inner support includes one or more ribs extending between the inner tube and the outer tube through the longitudinal channel;
wherein both the inner tube and the outer tube have first ends and second ends that are both open;
wherein the first end of the outer tube is connectable to a sonde body comprising electronics such that a watertight seal is formed and the second end of the outer tube is connectable to an end cap such that a watertight seal is formed; and
wherein the inner tube of the inner support encapsulates a power supply.

12. The housing of claim 11 wherein at least one rib connects the inner tube to the outer tube opposite the common wall.

13. The housing of claim 11 wherein the inner tube and the outer tube are both generally elliptical in cross-section or the inner tube is circular in cross-section and the outer tube is generally oval in cross-section.

14. The housing of claim 11 wherein the inner support comprises a first plastic, the outer sleeve comprises a second plastic, and the first plastic has a similar or higher melting point than the second plastic.

15. The housing of claim 14 wherein the first plastic is a filled plastic.

16. The housing of claim 11 wherein the housing, in an assembled state, can withstand external compressive forces when surrounded by water at depths of about 100 meters to about 300 meters.

17. The housing of claim 11 wherein the power supply comprises a battery.

18. The housing of claim 15 wherein the filled plastic and the second plastic both comprise plastic materials selected from the group consisting of a polycarbonate, a polybutylene terephthalate, a polyethylene terephthalate, and combinations thereof.

19. The housing of claim 18 wherein both the filled plastic and the second plastic comprise the same plastic material, a blend of a polycarbonate and a polybutylene terephthalate or a polycarbonate and a polyethylene terephthalate.

20. The housing of claim 15 wherein the filled plastic comprises about 30% to about 70% glass fibers.

21. The housing of claim 11 wherein a portion of the outer sleeve has an ergonomic inward contour for receipt in a hand of a user.

22. The housing of claim 11 wherein the one or more ribs run longitudinally the length of the longitudinal channel.

* * * * *